(12) United States Patent
Thomas

(10) Patent No.: US 6,513,423 B2
(45) Date of Patent: Feb. 4, 2003

(54) PICKLING MACHINE WITH HYDRAULICALLY BUFFERED NEEDLES

(75) Inventor: Manfred Thomas, Versmold (DE)

(73) Assignee: Schroeder Mashinenbau GmbH (DE)

(*) Notice: Subject to any disclaimer, the term of this patent is extended or adjusted under 35 U.S.C. 154(b) by 0 days.

(21) Appl. No.: 10/066,806

(22) Filed: Feb. 6, 2002

(65) Prior Publication Data
US 2002/0117059 A1 Aug. 29, 2002

(30) Foreign Application Priority Data
Feb. 7, 2001 (DE) .......................... 101 05 490

(51) Int. Cl.[7] .............................. A23L 1/00; B02B 3/00; B02B 3/12; A22C 17/00
(52) U.S. Cl. ............................................. 99/533; 99/535
(58) Field of Search ...................... 99/487, 532, 533, 99/535, 516; 426/281, 323, 574, 641; 452/57, 62, 66

(56) References Cited

U.S. PATENT DOCUMENTS

| | | | |
|---|---|---|---|
| 3,656,424 A | | 4/1972 | Evanson |
| 3,683,789 A | | 8/1972 | Beasley |
| 4,690,046 A | * | 9/1987 | Corominas ............... 99/533 |
| 4,924,771 A | * | 5/1990 | Langen et al. ............ 99/533 |
| 5,012,728 A | | 5/1991 | Langen et al. |

FOREIGN PATENT DOCUMENTS

EP    1 163 850 A1    6/2000

* cited by examiner

Primary Examiner—Timothy F. Simone
(74) Attorney, Agent, or Firm—Rothwell, Figg, Ernst & Manbeck

(57) ABSTRACT

A pickling machine includes a carrier, a plurality of needles mounted to the carrier, a valve for controlling the supply of brine to the needles, and a pressure cylinder associated with each of the needles for buffering them. The valve includes, for each pair of needle and pressure cylinder, a separate valve for individually closing off the pressure cylinder.

14 Claims, 3 Drawing Sheets

PICKLING MACHINE WITH HYDRAULICALLY BUFFERED NEEDLES

BACKGROUND OF THE INVENTION

1. Field of the Invention

The invention relates to a pickling machine comprising a plurality of hydraulically buffered needles that are arranged on a common carrier, valve means for controlling the supply of brine to the needles, and pressure cylinders associated with the needles for buffering the same.

2. Description of the Related Art

In such a pickling machine, the brine is injected under pressure into the items to be pickled by means of the needles. The items to be pickled are fed on a conveyer below the needles, and by lowering the carrier, the needles are forced into the items to be pickled. By means of the valve means, the supply of brine is so controlled that the brine in only discharged via the needles when the latter penetrate into the item to be pickled.

In most cases, the supply of brine to the needles is achieved via a brine chamber which is common to all the needles and is formed within the carrier. Then, a single valve blocking the flow of brine into the brine chamber is sufficed for controlling the supply of brine.

In certain cases, for example when pickling ham with bones, the needles should be buffered such that they are capable of retreating upwardly relative to the needle carrier, if they impinge onto a bone when the carrier is lowered. On the other hand, however, the needles must be biased downwardly with a force sufficient for causing the needles to penetrate into the item to be pickled. In principle, this may be achieved by forming, at each needle, a piston that is guided in a pressure cylinder. Then, the individual needles are connected to the brine chamber via their respective pressure cylinders, so that the piston is acted upon by the pressure of the brine. The active area of the piston is adapted to the pressure of the brine such that the force of the piston overcomes the resistance opposing to the penetration of the needle into the item to be pickled. If the needle hits a bone, the needle and the piston may retreat upwardly against the pressure of the brine.

This solution has the advantage that no mechanical components such as compression springs or the like are needed for buffering the needles, so that the construction of the machine can be simplified and cleaning of the machine can be facilitated. It is a drawback, however, that, if the needles are withdrawn from the item to be pickled and the supply valve has been closed, a relatively large amount of brine will still drop out of the needles. This leads to an increased consumption of brine and to a serious pollution of the working environment.

SUMMARY OF THE INVENTION

It is an object of the invention to provide a pickling machine of the type indicated above, in which the tendency of brine to drop out of the needles is suppressed.

According to the invention, this object is achieved by the features that the valve means comprise an individual valve for each needle and the pressure cylinders are arranged to be blocked individually by said valves.

Thus, when the valves have been closed, each individual needle communicates only with the relatively small volume of the associated pressure cylinder. When the needle is withdrawn from the item to be pickled and brine tends to leak out, a subatmospheric pressure will be built up in the pressure cylinder very rapidly and will suppress the leakage of brine. The pressure cylinder will not be vented because venting air could only enter through the needle itself which, however, is still filled with brine. By hydraulically separating the individual pressure cylinders from one another, it is avoided that air enters into the brine chamber through individual ones of the needles, and that an amount of brine, which corresponds to the volume of the air having entered, leaks out of other ones of the needles. In this way, the invention permits a very clean processing with smallest possible consumption of brine.

Preferably, the individual valves are constructed as tube valves that are arranged directly above the top ends of the pressure cylinders. Since all the valves lie in a common plane, it is possible to close all valves synchronously with a single squeeze grid, so that only a single control member is needed for controlling the plurality of valves, for example, a control member in the form of a tappet which moves the squeeze grid into the squeezing position. Thanks to the own elasticity of the tubing's forming the individual tube valves, the squeeze grid will automatically be returned into the open position when the tappet is released. Thus, no additional return means are needed. Since the needles and the associated pressure cylinders as well as the associated tube valves are arranged on a common vertical axis, cleaning of the brine supply system of the machine is facilitated considerably.

Typically, a pickling machine has a pressing member which is guided to be movable in vertical direction relative to the needle carrier and which is pierced by the lower ends of the needles. This pressing member has the main purpose of wiping the item to be pickled off from the needles when the latter are withdrawn upwardly. It is known that the relative movements between the pressing member and the needle carrier can be utilized for controlling the supply of brine. In the machine according to the invention, this can be achieved in a particularly simple way by forming a cam on a member connected to the pressing member, which cam acts upon the tappet and thus closes all tube valves, when the pressing member is in its lower extreme position relative to the needles.

According to a useful further development of the invention, the cam may be shaped such that it opens and closes the individual tube valves gradually while the pressing member moves upwardly relative to the needles. In this way, the flow rate of brine through the individual needles and, hence, the amount of brine injected into the item to be pickled, can be controlled in a stroke-dependant way, so that it is possible for example, to inject a larger amount of brine into the core region of the item to be pickled than into the peripheral regions. The stroke dependency of the flow rate of brine may be specifically adapted to the item to be pickled by appropriately selecting the control contour on the cam. This function principle may advantageously be utilized also independently of the features described above and thus constitutes a separate aspect of the invention.

When the pressing member is in its lower extreme position and the tube valves are held closed by the cam, the needles can be moved upwardly relative to the carrier, because the brine which is then displaced out of the pressure cylinders can be drained through the needles. However, as soon as the pressing member is lifted and the tube valves are opened, the pistons of all needles are subjected to the pressure again, so that all needles return into their lower end position relative to the needle carrier.

If there is only a very little start-up time between the timing at which the tube valves open and the timing at which the needles actually penetrate into the item to be pickled, then it may happen however, that the needle, that had been lifted previously, will still lag relative to the other needles when penetrating into the item to be pickled. This effect, which may possibly be undesirable, may be avoided for example by providing, in each pressure cylinder, a compression spring which is preferably removable and which returns the piston and the needle into the lower end position even before the piston is exposed to pressure. As an alternative, it is possible to prevent already the needles from being lifted, by blocking the needles in their lower end position, when the pressing member is in the lower extreme position. This may be achieved by means of a fixing member latch or clamping member, which is actuated by a cam, similarly as the tappet of the valve means.

BRIEF DESCRIPTION OF THE DRAWINGS

An embodiment example of the invention will now be explained in detail in conjunction with the accompanying drawings, in which.

DESCRIPTION OF A PREFERRED EMBODIMENT

Figure 1:
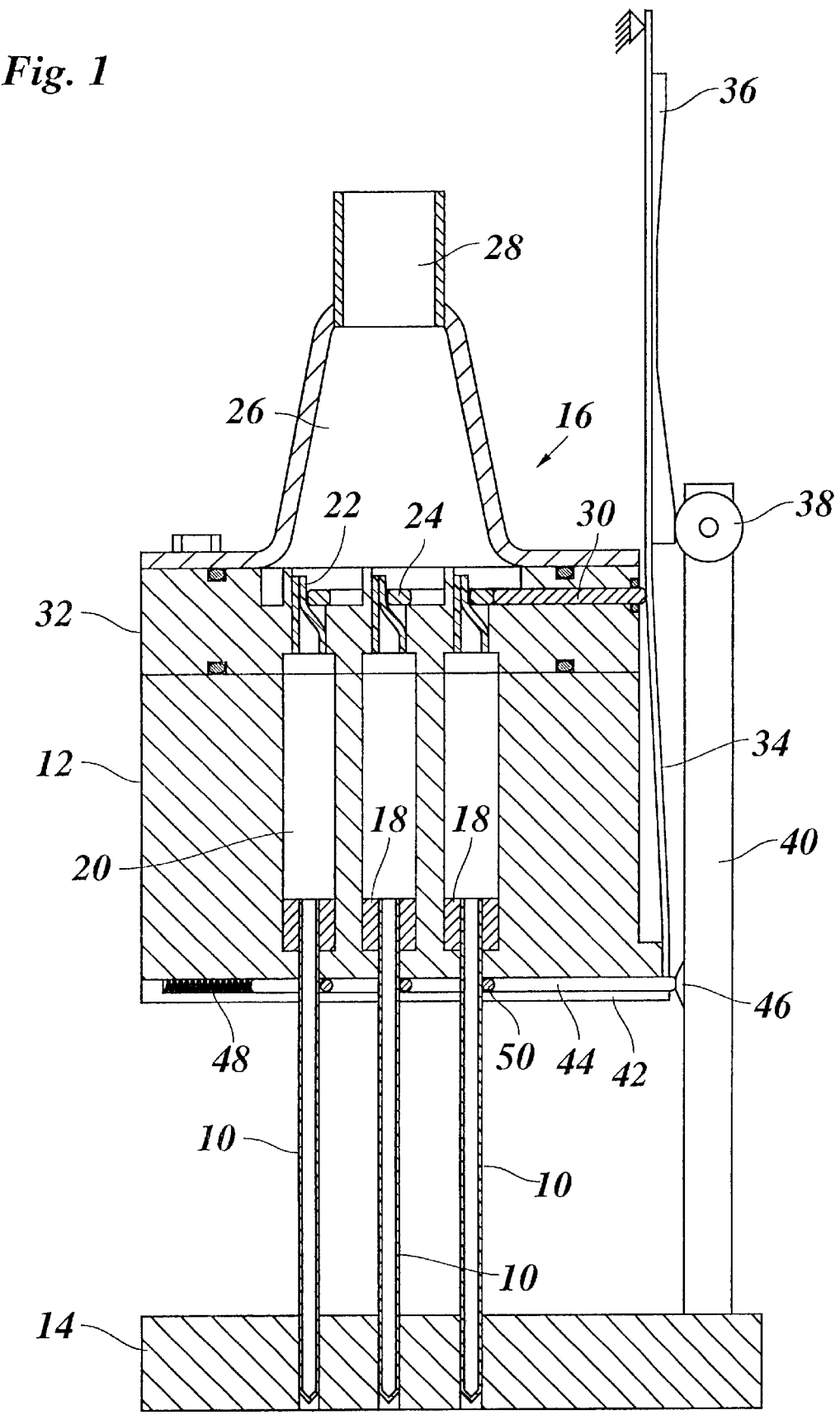
FIG. 1 is a vertical section through the essential parts of a pickling machine in a state before a pickling operation commences.

The pickling machine shown in FIG. 1 comprises at least one group of hollow needles 10 which are mounted to a carrier 12. The carrier 12 is movably guided in vertical direction by means of rails which have not been shown and is arranged to be lifted and lowered by means of a drive system which has not been shown, neither. A pressing member 14 pierced by the needles 10 is secured to the carrier 12 by guides, which have not been shown, in a manner to be movable in vertical direction, and is elastically biased downwards. When, by means of a conveyer which has not been shown, an item to be pickled has been moved into a position below the lower ends of the needles 10, the carrier 12 is moved downward, so that the pressing member 10 is placed onto the item to be pickled. Then, with the pressing member 14 at rest, the carrier 12 and the needles 10 continue to move downwardly, so that the needles penetrate into the item to be pickled. By means of valve means 16 provided on the carrier 12, brine is supplied under pressure to the individual needles. This brine is then injected into the item to be pickled through openings formed in the lower end portions of the needles 10.

Fixed to an upper end of each of the needles 10 is a piston 18, which is slidably guided in a pressure cylinder 20 formed in the carrier 12. A separate pressure cylinder 20 is provided for each needle 10, and the valve means 16 comprise a separate valve 22, formed by a tube valve, for each of these pressure cylinders 20. The valves 22 are each formed by a short vertical tubing made of elastic material and is arranged coaxially with the pressure cylinder 20 at the top end of the same and, in the closed state, is squeezed by means of a squeeze grid 24, as is shown in FIG. 1.

Figure 2:
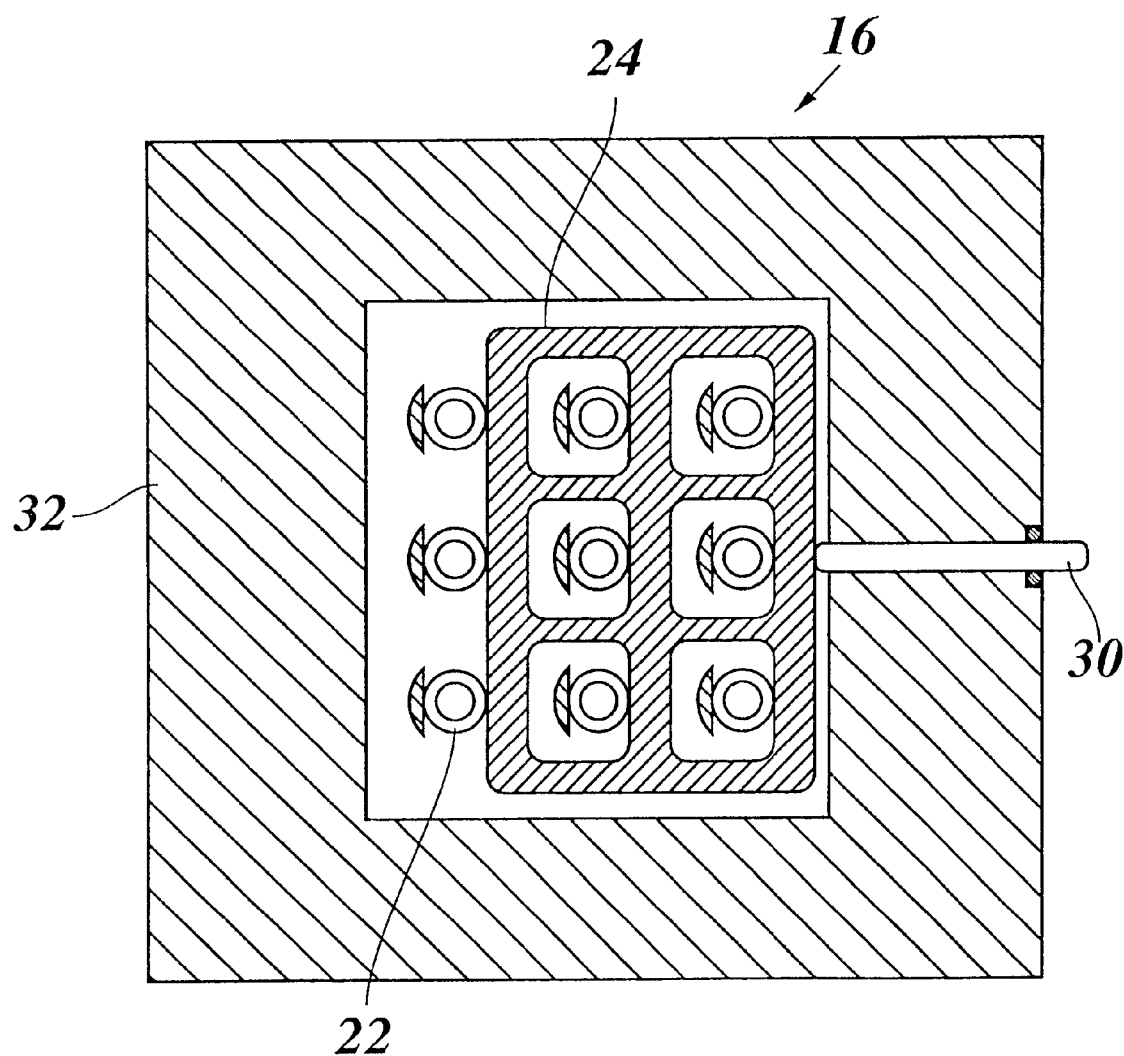
FIG. 2 is a horizontal section through valve means of the pickling machine shown in FIG. 1.

FIG. 2 shows the valves 22 in the open state as well as the associated squeeze grid 24 in a plan view.

As is shown in FIG. 1, all the valves 22 arranged at the bottom of a common, closed and pressure-tight brine chamber 26, to which brine is supplied under pressure via an inlet port 28 by means of a pump which has not been shown.

The squeeze grid 24 is biased in opening direction, i. e. towards the right in FIG. 1, by the elasticity of the tube valves 22, but is held in the squeezing position by a tappet 30 in the condition shown in FIG. 1. The free end of the tappet 30 projects out of a block 32, accommodating the valve means 16 and is engaged by a leaf spring 34. A cam 36 is formed on the side of the leaf spring 34 facing away from the tappet 30 and in a position offset from this tappet. The cam co-operates with a roller 38 that is mounted to a column 40 projecting upwardly from the pressing member 14.

In the condition shown in FIG. 1, the pressing member 14 assumes its lower extreme position relative to the carrier 12, so that the tips of the needles 10 are accommodated and protected in bores of the pressing member. The cam 36, which engages the roller 38, deflects the leaf spring 34 such that it presses the tappet 30 into the block 32, so that all the valves 22 are squeezed by the squeeze grid 24. Thus, in this condition, the supply of brine to the needles 10 is blocked. The elasticity of the leaf spring 34 permits to adjust the squeezing force of the squeeze grid 24 such that the tube valves 22 are sealingly closed but not damaged.

In the shown embodiment, a guide 42, in which a ladder-shaped clamping member 44 is guided to be movable in horizontal direction, is mounted to the bottom side of the carrier 12. By a cam 46 formed at the column 40, the ladder-shaped clamping member 44 is held, against the force of a return spring 48, in a position in which the rungs 50 of the ladder engage the individual needles 10. The rungs 50, however, have a certain elasticity and thereby exert a clamping force onto the needles 10, by which these needles are held in the shown position in which the piston 18 is in its lower end position.

Figure 3:
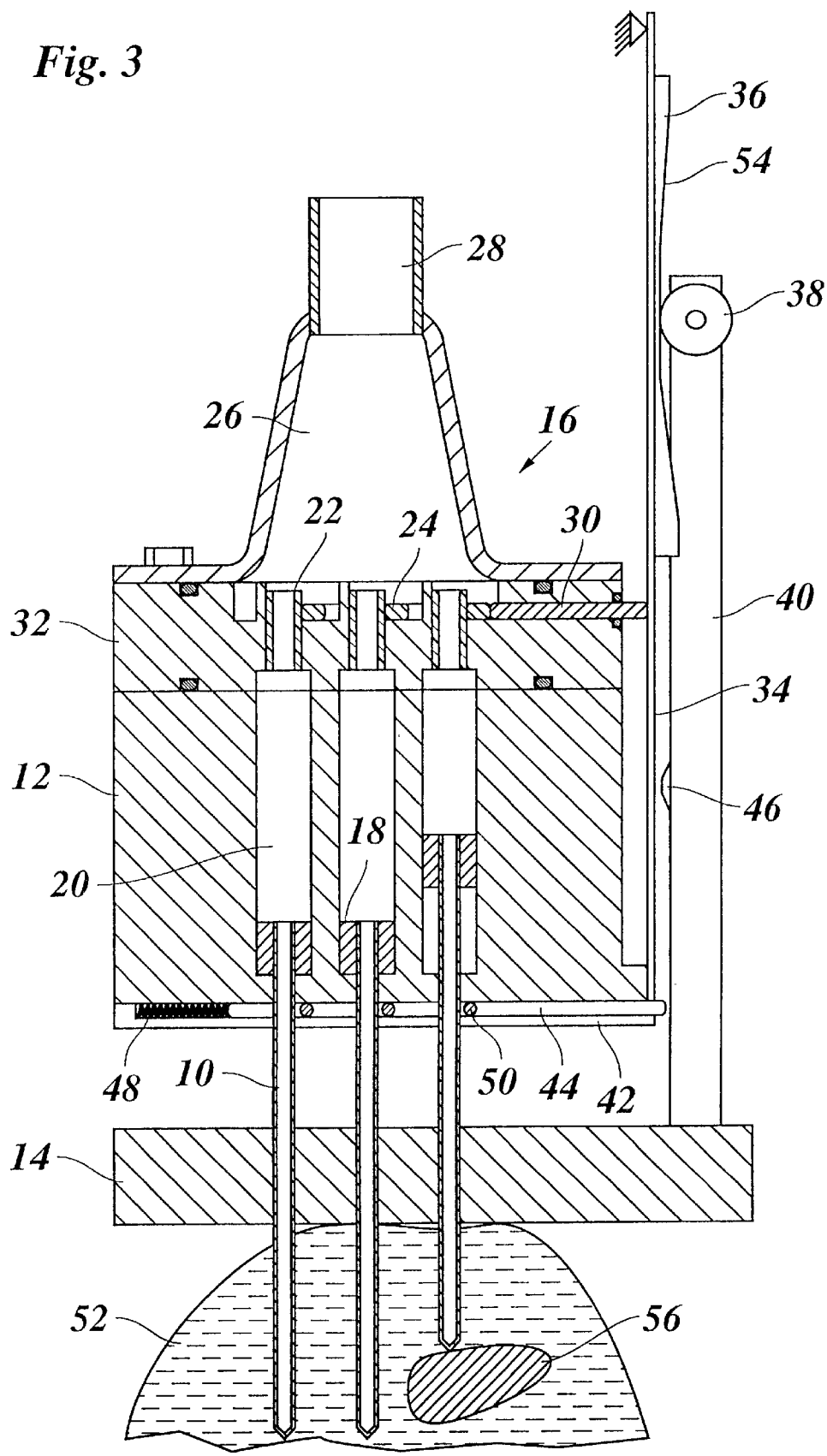
FIG. 3 is a vertical section through the pickling machine in a state during a pickling operation.

FIG. 3 illustrates the condition in which the carrier 12 is lowered during a pickling operation. The pressing member 14 rests on the item 52 to be pickled and is thus lifted relative to the carrier 12, whereas the needles 10 penetrate into the item to be pickled. The cam 46 has released the clamping member 44, and the return spring 48 has moved the clamping member slightly to the right, so that the rungs 50 no longer engage the needles 10. The roller 30 moves along a control contour 54 of the cam 36. This control contour 54 has such a shape that the leaf spring 34 was allowed to return into its neutral position. The tube valves 22 have therefore been able to displace the squeeze grid 24 and the tappet 30 to the right and are now open, so that the brine can enter into the pressure cylinders 20. The pistons 18 are thus subject to the pressure of the brine and exert a certain downwardly directed force onto the needles 10, so that the needles penetrate into the item 52 to be pickled. Simultaneously, the brine is injected through the needles into the item to be pickled.

In the example shown in FIG. 3, one of the needles 10 has hit a bone 56 which prevents this needle from penetrating further. The resistance created thereby is so large that the associated piston 18 moves upwardly against the pressure of the brine in the pressure cylinder 20.

In the example shown, the control contour 54 of the cam 36 has such a shape, that, when the injection operation begins, the valves 22 are opened only gradually and are closed again to some extent, when the roller 38 moves further upwardly by the end of the injection operation, so that the flow rate of brine is reduced. In this way, the flow rate of the brine through the valves 22 and the needles 10 is controlled as a function of the stroke. Optionally, separate tappets and cams with different shapes may be used for the individual needles or needle groups, so that each needle or group of needles has a different injection characteristic.

When the carrier 12 has been lowered completely, it is lifted again, so that the needles 10 are withdrawn from the item to be pickled. During this, the needle which had been pressed upwardly by the bone 56, will also return into its lower end position. While the needles are retracted from the item to be pickled, this item is held down by the pressing member 14. When the pressing member 14 has again reached its lower extreme position relative to the carrier 12, the cam 46 returns the clamping member 44 into the clamping position, so that the needles are then prevented from being moved vertically relative to the carrier 12. Simultaneously, the roller 38 rolls over the lower part of the cam 36, so that the valves 22 are again closed by the tappet 30. Since each individual pressure cylinder 20 is sealingly closed-off by the associated valve 22, no air is allowed to enter into the pressure cylinder, and, accordingly, no brine can leak out of the associated needle.

What is claimed is:

1. A pickling machine comprising:

a carrier, a plurality of needles mounted to said carrier, a brine supply system for supplying brine to said needles, said supply system comprising, for each needle, a separate valve for individually controlling the supply of brine to said needle, and wherein a buffer mechanism is provided for each needle, said buffer mechanism permitting a retraction movement of the needle into said carrier and comprising a pressure cylinder to which brine is supplied under pressure by said supply system, so that the needle is biased in a direction opposite to the direction of said retraction movement by the pressure of the brine, and wherein said valves are arranged to close-off said pressure cylinders individually.

2. The pickling machine of claim 1, wherein the valves are formed by tube valves each of which is arranged coaxially with the associated pressure cylinder at one end thereof.

3. The pickling machine of claim 2, comprising a squeeze grid, which is common to said valves for squeezing the same.

4. The pickling machine of claim 2, comprising a tappet, which is moveable transversely of the needles for closing said valves, a pressing member movable relative to said carrier in a direction in parallel with said needles, and a cam connected to said pressing member for actuating said tappet.

5. The pickling machine of claim 4, wherein said cam acts upon said tappet through a leaf spring.

6. The pickling machine of claim 3, comprising a tappet, which is moveable transversely of the needles for closing said valves, a pressing member movable relative to said carrier in a direction in parallel with said needles, and a cam connected to said pressing member for actuating said tappet.

7. The pickling machine of claim 6, wherein said cam acts upon said tappet through a leaf spring.

8. The pickling machine of claim 1, comprising a fixing member for fixing the needles in an end position in which they are extended out of said carrier, in a state in which said valves are closed.

9. The pickling machine of claim 8, in which said fixing member is provided in a position in which said needles exit from said carrier and is arranged to exert a transverse clamping force on the needles in said position.

10. The pickling machine of claim 8, wherein said fixing member is actuated by a cam which moves together with the pressing member.

11. The pickling machine of claim 9, wherein said fixing member is actuated by a cam which moves together with the pressing member.

12. A pickling machine, comprising:

a carrier, a plurality of needles mounted to said carrier, a pressing member movable relative to said carrier in a longitudinal direction of said needles, and a brine supply system for supplying brine to said needles, said supply system comprising, for each needle, a separate valve for individually controlling the supply of brine to said needles, said valve being actuated by a movement of said pressing member relative to said carrier, wherein said pressing member acts upon said valve through a cam having a control contour which causes said valve to be adjusted gradually and steplessly in accordance with a distance traveled by the pressing member relative to the carrier, so that the amount of brine flowing through said valve per time unit depends on the depth to which said needles penetrate into an item to be pickled.

13. A pickling machine comprising:

a carrier, a brine supply system, a plurality of needles slidably disposed in said carrier, each said needle comprising a valve controlling a supply of brine to said needle, and a pressure cylinder disposed between said carrier and said needle to which brine is supplied under a pressure by said supply system, said pressure biasing said needle in a direction opposite to a direction of reaction of said needle, and wherein said valves close-off said pressure cylinders individually.

14. The pickling machine of claim 13, comprising further:

a pressing member movably disposed on said carrier, a cam fixedly disposed on said pressing member, said cam having a control contour, said control contour slidably contacting said valve, wherein said control contour causes said valve to be closed as said pressing member travels relative to the carrier, so that the amount of brine flowing through said valve per time unit depends on the depth to which said needles penetrate into an item to be pickled.

* * * * *